US005450940A

United States Patent [19]

Rathert et al.

[11] Patent Number: 5,450,940

[45] Date of Patent: Sep. 19, 1995

[54] DELIVERY SYSTEM FOR BOOK-SEWING MACHINE

[75] Inventors: Horst Rathert, Minden; Ansgar Rohe-Krebeck, Damme, both of Germany

[73] Assignee: Kolbus GmbH & Co. KG, Rahden, Germany

[21] Appl. No.: 237,587

[22] Filed: May 3, 1994

[51] Int. Cl.[6] ............ B65G 47/24

[52] U.S. Cl. ............ 198/412; 198/406; 198/411

[58] Field of Search ............ 198/406, 409, 410, 411, 198/412, 413, 414; 414/796.4, 798.9, 783, 796

[56] References Cited

U.S. PATENT DOCUMENTS

| | | | |
|---|---|---|---|
| 3,516,657 | 6/1970 | Knudson . | |
| 3,602,358 | 8/1971 | Jakobsson . | |
| 3,633,727 | 1/1972 | Brenner | 198/412 |
| 3,763,990 | 10/1973 | Ouska | 198/412 |
| 3,884,362 | 5/1975 | Brenner et al. | 198/412 X |
| 3,901,166 | 8/1975 | Morandi et al. | 198/411 |
| 3,974,921 | 8/1976 | Tokuno | 198/411 X |
| 4,462,746 | 7/1984 | Smets | 414/798.9 X |
| 4,494,645 | 1/1985 | Hessling et al. . | |
| 4,564,188 | 1/1986 | McNair | 414/798.9 X |
| 4,613,268 | 9/1986 | Capdeboscq . | |
| 4,867,299 | 9/1989 | Fukuoka et al. . | |
| 4,921,088 | 5/1990 | Ter Horst | 198/419.1 X |
| 5,006,040 | 4/1991 | Frey . | |
| 5,020,655 | 6/1991 | Cruver | 198/419.1 X |
| 5,141,095 | 8/1992 | Kamp . | |
| 5,271,709 | 12/1993 | VanderMeer et al. | 198/419.1 X |
| 5,342,040 | 8/1994 | Markgraf | 271/251 |

FOREIGN PATENT DOCUMENTS

| | | |
|---|---|---|
| 0317232 | 11/1988 | European Pat. Off. . |
| 2193759 | 7/1972 | France . |
| 2525193 | 4/1982 | France . |
| 2027906 | 1/1971 | Germany . |
| 2019266 | 2/1971 | Germany . |
| 2205153 | 8/1973 | Germany . |
| 2226455 | 12/1973 | Germany . |
| 2432579 | 1/1976 | Germany . |
| 2844568A1 | 5/1979 | Germany . |
| 1917778 | 2/1982 | Germany . |
| 4000263A1 | 4/1991 | Germany . |

*Primary Examiner*—James R. Bidwell
*Attorney, Agent, or Firm*—Chilton, Alix & Van Kirk

[57] ABSTRACT

A delivery system for receiving book blocks discharged from a book-sewing machine on a transverse stack conveyor, the book blocks on the transverse stack being supported on their front edges and thus being vertically oriented, and rearranging the book blocks so as to be horizontally oriented. The delivery system subsequently reorients the horizontally arranged book blocks and collects the reoriented book blocks into stable stacks.

14 Claims, 2 Drawing Sheets

DELIVERY SYSTEM FOR BOOK-SEWING MACHINE

BACKGROUND OF THE INVENTION

1. Field of the Invention

The present invention relates to the handling of partially completed books during a book manufacturing process and particularly to creation of stable stacks of book blocks, subsequent to the stitching thereof, which may be placed in palletized storage for future use. More specifically, this invention is directed to a delivery system for receiving book blocks from a book-sewing machine, and especially to apparatus for acquiring stitched book blocks which exit a sewing machine in a first orientation and automatically manipulating the thus acquired book blocks so as to create stable book block stacks which may be stored for future processing. Accordingly, the general objects of the present invention are to provide novel and improved methods and apparatus of such character.

2. Description of the Prior Art

Delivery systems which are located intermediate book-sewing machines and a palletizing station are known in the art. Such known systems include a transverse stack conveyor, which is located at the discharge end of the sewing machine, and an associated stacking table on which the sewed book blocks accumulate. The book blocks which exit a book-sewing machine will be vertically oriented, i.e., will be supported on their front edges. The prior art delivery systems have customarily conveyed the stitched book blocks in the vertical orientation and guided at their opposite ends. The basting threads which extend between the individual book blocks are automatically cut, by means of a cutting device, to separate the individual book blocks as they are carried along the delivery system.

The separated book blocks must be removed from the delivery system and stacked on pallets. This palletizing is a very labor intensive operation. In the interest of reducing the labor required to manufacture a book, attachments which rearrange the book blocks to place them in a separated horizontal orientation have been devised for use with book sewing machines. For example, it has been proposed to provide a first conveyor, located behind the transverse stack conveyor, onto which the book blocks are individually pushed. The attachment also includes a second conveyor, oriented at right angles to the transverse stack conveyor, onto which the book blocks are dropped to form a partial stack. As an alternative to the use of such a second conveyor, a stacking mechanism may be employed. The book blocks to be stacked free fall onto the stacking mechanism which will rotate through an angle of 180° after each stack has been formed.

In order to ensure stable storage, it is important that precise alignment of the individual book block layers be maintained. That is, the book block stacks must be formed in such a manner that the possibility of relative sliding motion between the layers comprising a stack of book blocks on a pallet is minimized.

In the case of book-sewing machines which do not have the above-briefly discussed stack forming attachments, the removal of the book blocks from the transverse stack conveyor for subsequent stacking on a pallet is carried out by hand. During this hand stacking, in order to form stable stacks, the book blocks must be individually arranged so that the front edge of each book block, or the front edges of the book blocks of a partial stack, will be located in alignment with the sewed, spine edge of the adjacent book blocks or partial stacks. Restated, in each stack, the adjacent book blocks or partial stacks of book blocks are rotated by 180° relative to one another. The removal of book blocks from the transverse stack conveyor and the stacking thereof on pallets while retaining the precise alignment in which the printed sheets were conveyed, and while also ensuring that the above-described front-to-back orientation is achieved, is a task requiring great effort and a high degree of manual dexterity, particularly in the case of high performance book-sewing machines.

In actual practice, both in the manual stacking of book blocks or partial book blocks removed from a transverse stack conveyor and in the use of the above-briefly described attachments which also require manual placement of the book blocks on pallets, the alignment of the book block stacks is often lost due to shifting of the individual book block layers in relation to one another. When the palletizing operation has been completed, any such misalignment is extremely difficult or impossible to correct. The misalignment results in unstable storage and can cause degradation of the book blocks which makes further use thereof in the completion of the book manufacturing process difficult.

SUMMARY OF THE INVENTION

The present invention overcomes the above-briefly discussed and other deficiencies and disadvantages of the prior art by providing a novel technique for acquiring book blocks exiting from a book-sewing machine and forming the thus acquired book blocks into stable stacks. The present invention also encompasses an improved delivery system which implements this novel method.

Apparatus in accordance with the invention engages individual book blocks or partial stacks of book blocks and rotates the acquired book block(s) from the vertical orientation, which they possess upon exiting a book-sewing machine, into a horizontal orientation. The delivery system thereafter further selectively reorients the book block(s) in order to achieve a desired front edge-spine-edge alternating order within the stacks. Finally, the delivery system of the present invention stacks the reoriented book block(s).

Apparatus in accordance with the invention for transferring the book blocks from the transverse stack conveyor of a book-sewing machine to a downstream mechanism which produced the desired front-to-back arrangement comprises means for engaging at least the most downstream located book block on the transverse stack conveyor and rotating the engaged book blocks from the vertical orientation into a substantially horizontal orientation. The engaging and rotating means includes a member which forms a rotatable stop at the end of the transverse stack conveyor. The rotatable stop defines a support plane and has a first position, wherein the support plane is substantially parallel to the pages of the book blocks on the transvere stack conveyor, and a second position where the support plane is oriented substantially horizontally. The engaging and rotating means also includes book block engaging means which is mounted for rotation with the stop. The book block engaging means is energizable to engage a book block which is to be reoriented and to hold the engaged book block on the stop during the rotation thereof.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures in which.

DESCRIPTION OF THE DISCLOSED EMBODIMENTS

Figures 1, 2:
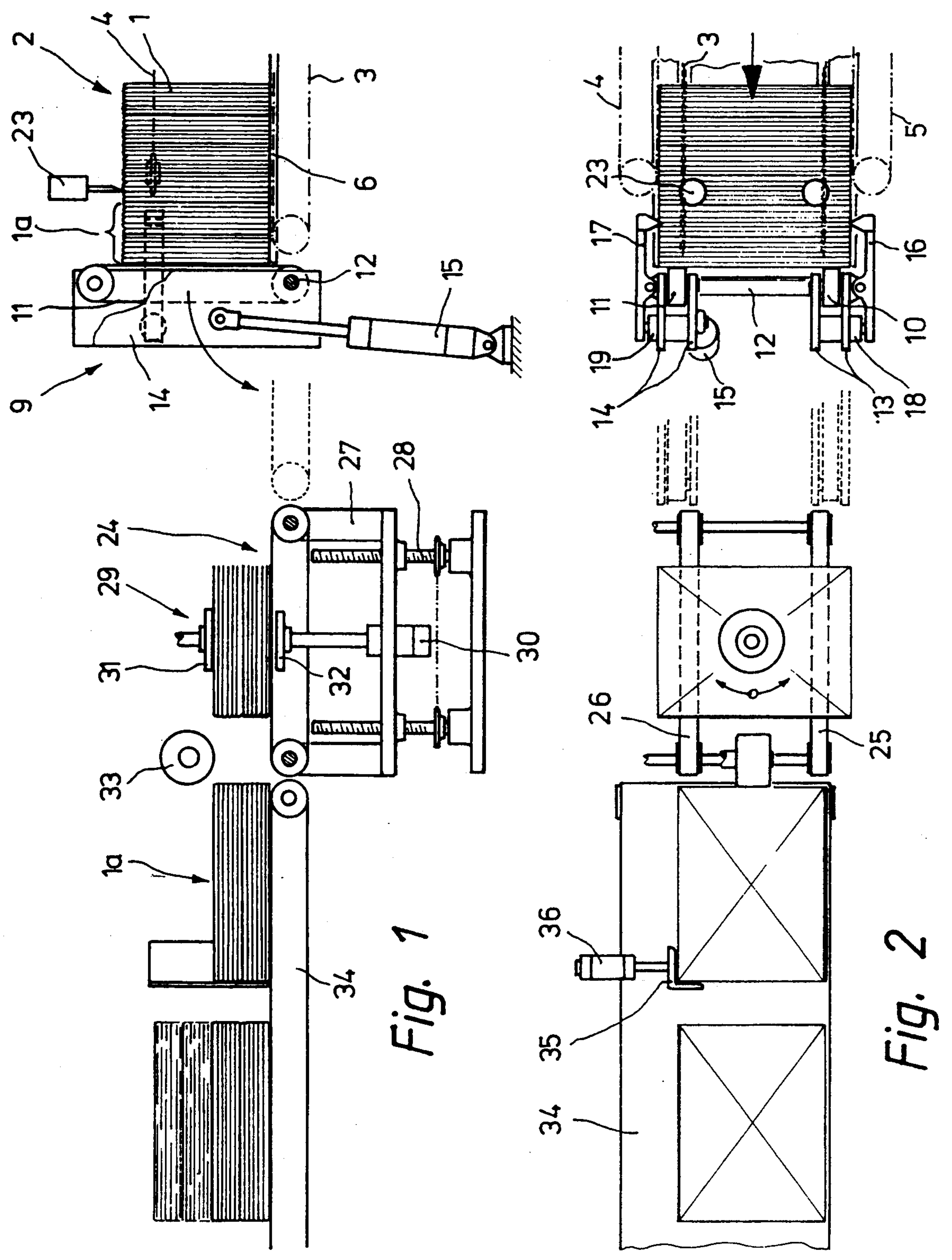
FIG. 1 is a schematic, side-elevation view of a delivery system for a book-sewing machine in accordance with the invention.
FIG. 2 is a top view of the apparatus of FIG. 1.

Referring to FIGS. 1 and 2, the book blocks 1 which have been stitched in an upstream book-sewing machine, not shown, are transported to the delivery system of the present invention by means of a transverse stack conveyor indicated generally at 2. The transverse stack conveyor 2 will typically be a part of the sewing machine. The books arriving on conveyor 2 are vertically oriented, i.e., are standing on their trimmed front edges. The transverse conveyor 2 includes a lower belt or chain 3 and a pair of oppositely disposed side support belts or chains 4, 5. Conveyor 2 also includes a support table 6.

The transverse stack conveyor 2 terminates at a transfer station which is indicated generally at 9. As will be explained in greater detail below, the transfer station 9 is defined by a mechanism which engages either individual book blocks 1 or a partial stack 1*a* of book blocks and reorients the engaged product from a standing position, i.e., the above-mentioned vertical orientation, to a lying position, i.e., a horizontal orientation. The transfer station mechanism 9 includes a member or members which function as a rotatable stop at the end of conveyor 2. In the embodiment of FIGS. 1 and 2, this rotatable stop comprises a pair of spaced belt conveyors 10, 11 which are driven by means, not shown. The belt conveyors 10, 11 are mounted in a frame which can be swiveled from the first vertical position shown in FIGS. 1 and 2, where the surfaces of the belts are parallel to the pages of the book blocks 1 supported on transverse stack conveyor 2, to a second position where the belt upper surfaces lie generally in a horizontal plane. For this purpose, the pulleys for belts 10, 11 are mounted on a stationary axle 12. The belts 10, 11 are, as may best be seen from FIG. 2, respectively located between dual side frame members 13 and 14. The swiveling motion of the belts 10, 11 and their supporting frame is accomplished by means of a fluidic actuator 15 having its piston rod connected to the frame member 14 which is disposed inwardly with respect to belt 11.

Continuing to discuss the transfer station mechanism, a pair of book block holders 16, 17, having wedge-shaped book block engaging ends, are pivotally mounted to respective of the outer of the side frame members 13, 14. The holders 16, 17 are movable with the associated frame members and belts in response to operation of the actuator 15. The holders 16 and 17 are respectively operated by fluidic actuators 18, 19 to selectively engage the top and bottom of a book block 1 to separate the engaged book block from the upstream stack of book blocks which are supported on the transverse stack conveyor 2. The holders 16, 17 also retain the partial book block stack 1*a*, i.e., the engaged book block and all book blocks on the transverse stack conveyor downstream thereof, against the conveyor belts 10, 11 during the movement thereof from the vertical position to the horizontal position.

Book blocks 1 arriving from a book-sewing machine on transverse stack conveyor 2 will be pushed against the conveyor belts 10, 11 which have been rotated into a vertical position and are stationary. The arrival of a sufficient number of book blocks to define a partial stack 1*a* is detected by means of a sensor, not shown, which may be a photoelectric device. In response to a signal provided by the sensor, the actuators 18, 19 are caused to impart inward pivotal motion to the holders 16, 17 thereby causing the wedge-shaped tip portions thereof to engage a book block as depicted in FIG. 2. Simultaneously, a hold-back or notion inhibiting mechanism, indicated schematically at 23, will be energized to engage the back, i.e., the spine-edge, of the book block located immediately upstream of the book block which has been engaged by holders 16, 17. With the partial book block 1*a* engaged and the remaining book blocks on the transverse stack conveyor 2 immobilized, the conveyor belts 10, 11, with the partial book block stack 1*a* held thereagainst by the holders 16, 17, is caused to rotate 90° into the horizontal position. When this rotation, produced by the actuator 15, is completed, the book blocks comprising the partial book block stack 1*a* will be horizontally oriented and the belts 10, 11 will be located in the plane of the conveyor belts of a downstream rotatable conveyor which has been indicated generally at 24.

When the conveyor belts 10, 11 are in a horizontal plane, the drive for the belts is energized and the partial book block stack 1*a* will be moved in the downstream direction onto the parallel conveyor belts 25, 26 of the rotatable conveyor 24. The belts 25, 26 are spacially displaced and are mounted in a lifting frame 27. The vertical position of frame 27, and thus of belts 25 and 26 and the partial book block stack 1*a* supported thereon, is adjustable by means of lifting jacks such as indicated schematically at 28. The rotatable conveyor 24 also includes a clamping and turning mechanism which has been indicated generally at 29. Such clamping and turning mechanisms, having oppositely disposed upper and lower rotating plates 31, 32, are known in the art. The clamping and turning mechanism 29 is also supported on lifting frame 27 and may be selectively driven about a vertical axis 90° in either the clockwise or counterclockwise direction.

The conveyor belts 25, 26 of the rotatable conveyor 24 are driven in synchronism with the belts 10, 11 and move the partial book block stack to a position where it is centered with respect to the rotating plates of the clamping and turning mechanism 29. The clamping action of the plates 31, 32 will preferably be accomplished through the use of a pneumatic actuator. During rotation of a clamped book block stack 1*a*, the stack is lifted from the belts through the action of the fluidic actuator 30. The lifting and rotation will bring the partial stack 1*a* to the desired delivery height at which point it will, in response to the raising of frame 27 by jacks 28, again be engaged by the belts 25, 26. This delivery height will be determined by the level of the product previously stacked on a downstream delivery conveyor 34.

When the appropriate delivery height and rotation to the desired orientation has been achieved, the drive for belts 25, 26 is reenergized. If the partial book block stack 1*a* is the first, i.e., the lowermost, product of a stack being formed, the feed speed of belts 25, 26 will be synchronized with movement of conveyor 34 and the operation of a retractable stop 35. The first partial stack will run up against the stop bracket 35. Stop 35 will be positioned by an actuator 36 at a point which is commensurate with the size of the book blocks being stacked. When the first partial stack contacts the stop bracket 35, the conveyor 34 and the belts 25, 26 are stopped. During subsequent stacking, additional partial book block stacks 1*a* are moved onto the top of the stationary book blocks previously deposited on conveyor 34 with correct alignment of each incoming partial stack being ensured by stop bracket 35. The transfer of the partial book block stacks 1*a* from conveyors 25, 26 onto conveyor 34 is aided by means of a pressure roller 33 which is operated in synchronism with the belts 25, 26. Pressure roller 33 is also supported from the lifting frame 27.

When the stack of book blocks in engagement with the stop bracket 35 reaches the desired final height, the stop is retracted and the rotatable conveyor 24 conditioned to begin the build-up of the next stack in the manner described above. The exercise of control over the times for extension and retraction of the stop bracket 35 will result in the book block stacks on conveyor 34 being closely spaced to one another as shown. The book block stacks on delivery conveyor 34 are in condition for storage on pallets and can be removed from conveyor 34 either automatically or manually.

Figure 3:
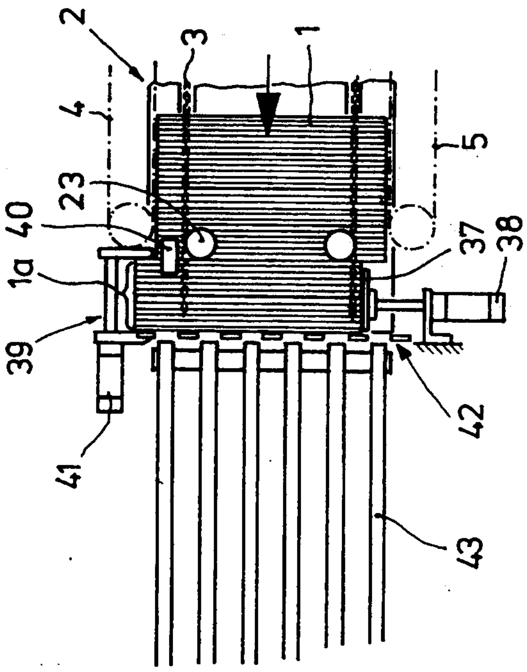
FIG. 3 is a top view of a portion of an alternative delivery system in accordance with the invention.

Referring to FIG. 3, an alternative technique for reorienting the book blocks 1, or partial book block stacks 1*a*, from their initial vertical orientation to horizontal may make use of a pusher mechanism 37 and an associated take-up clamp which has been indicated generally at 39. The pusher mechanism, under the control of an actuator 38, will displace the book block or partial book block stack 1*a* a limited distance in a direction which is transverse with respect to the direction of motion of the transverse conveyor 2. This transverse motion moves the partial book block stack 1*a* into position between the jaws of the take-up clamp 39. The take-up clamp jaws are then closed by means of an actuator 41. The take-up clamp 39 is supported on a rack 42 which may be pivoted, by means not shown, between the vertical position indicated in FIG. 3 and a horizontal position. In the horizontal position, the teeth of rack 42 are disposed between the belts 43 of a downstream conveyor. In the FIG. 3 embodiment, a support member 40, which may be in the form of a brush, will act upon the top edge of the book block 1 which is adjacent to the most upstream book block of the partial stack 1*a* to be transferred. The belts 43 will deliver the transferred partial book block stack 1*a* onto the rotatable conveyor 29 of the embodiment of FIGS. 1 and 2.

Figure 4:
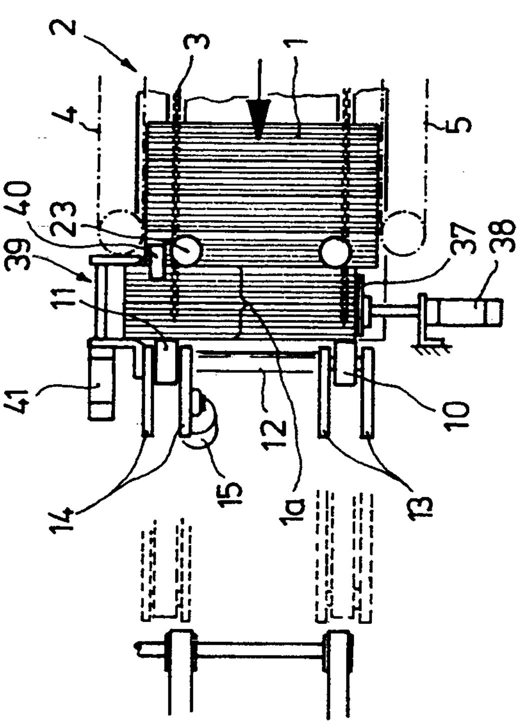
FIG. 4 is a partial top view of yet another alternative of a delivery system in accordance with the invention.

A further alternative is partially shown in FIG. 4. In the FIG. 4 arrangement, the take-up clamp 39 is mounted on the support frame for conveyor belts 10 and 11 and thus will move with belts 10, 11 from the vertical position to the horizontal position.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A delivery system for use with a book-sewing machine, the book-sewing machine having a transverse stack conveyor for accumulating sewn book blocks in an abutting relationship, the thus accumulated book blocks being supported on their front edges with the pages comprising the book blocks thus being substantially vertically oriented, the delivery system comprising:

- means for engaging at least the most downstream located book block on the transverse stack conveyor and rotating the engaged book block from the vertical orientation into a substantially horizontal orientation, said engaging and rotating means including:
  - movable stop means positioned adjacent the downstream end of the transverse stack conveyor, said stop means defining a rotatable support plane and having a first position wherein said support plane is substantially parallel to the pages of the book blocks on the transverse stack conveyor, said stop means having a second position where said support plane is oriented substantially horizontally; and
  - book block engaging means mounted for rotation with said stop means, said book block engaging means being energizable to engage a book block to be reoriented and to hold the engaged book block on said stop means during the rotation thereof, and
- means for selectively inhibiting the motion of book blocks on the transverse stack conveyor, said motion inhibiting means contacting the book block on the transverse stack conveyor which is located adjacent to the most upstream book block engaged by said book block engaging means and maintaining said contacted adjacent book block in a substantially vertical orientation, said motion inhibiting means also retarding motion of said adjacent book block in the direction of said engaging means whereby the accumulated book blocks supported on the transverse stack conveyor upstream of the book block engaged by said book block engaging means are immobilized during the rotation of said stop means from said first position to said second position.

2. The apparatus of claim 1 wherein said movable stop means comprises:

- belt conveyor means, said belt conveyor means being mounted for pivotal motion about a first end thereof, said belt conveyor means including at least a first conveyor belt having a surface which defines said support plane; and
- actuator means for imparting motion to said belt conveyor means whereby said support plane will move between a substantially vertical first position and a substantially horizontal second position; and wherein said book block engaging means comprises:
- holding means selectively operable to hold and release a book block to be moved with said belt conveyor means.

3. The apparatus of claim 1 further comprising:

- means for controllably rotating book blocks about a vertical axis, said rotating means being located downstream of said movable stop means for receiving book blocks which have been placed in a horizontal orientation, said rotating means selectively further reorienting said book blocks, said rotating means including:

connecting conveyor means, said connecting conveyor means being substantially coplanar with said support plane when in the horizontal orientation;

rotatable clamp means, said rotatable clamp means engaging a book block on said connecting conveyor means raising and rotating the book block engaged thereby; and means for adjusting the vertical position of said connecting conveyor means so that rotated book blocks can be discharged therefrom at a selected delivery elevation.

4. The apparatus of claim 3 wherein said rotating means further comprises:

pressure roller means for engaging a book block supported on said connecting conveyor means and applying a propelling force thereto in a discharge direction, the position of said pressure roller being adjustable with the position of said connecting conveyor means.

5. The apparatus of claim 3 further comprising a delivery conveyor located downstream of said rotating means, said delivery conveyor being synchronized with said connecting conveyor means.

6. The apparatus of claim 1 wherein said stop means comprises a pivotal rack.

7. The apparatus of claim 3 wherein said movable stop means comprises:

belt conveyor means, said belt conveyor means being mounted for pivotal motion about a first end thereof, said belt conveyor means including at least a first conveyor belt having a surface which defines said support plane; and actuator means for imparting motion to said belt conveyor means whereby said support plane will move between a substantially vertical position and a substantially horizontal position; and wherein said book block engaging means comprises:

holding means selectively operable to hold and release a book block to be moved with said belt conveyor means.

8. The apparatus of claim 7 further comprising a delivery conveyor located downstream of said rotating means, said delivery conveyor being synchronized with said connecting conveyor means.

9. The apparatus of claim 6 further comprising:

means for controllably rotating book blocks about a vertical axis, said rotating means being located downstream of said movable stop means for receiving book blocks which have been placed in a horizontal orientation, said rotating means selectively further reorienting said book blocks, said rotating means including:

connecting conveyor means, said connecting conveyor means being substantially coplanar with said support plane when in the horizontal orientation;

rotatable clamp means, said rotatable clamp means engaging a book block on said connecting conveyor means raising and rotating the book block engaged thereby; and means for adjusting the vertical position of said connecting conveyor means so that rotated book blocks can be discharged therefrom at a selected delivery elevation.

10. A delivery system for use with a book-sewing machine, the book-sewing machine having a transverse stack conveyor for accumulating sewn book blocks in an abutting relationship, the thus accumulated book blocks being supported on their front edges with the pages comprising the book blocks thus being substantially vertically oriented, the delivery system comprising:

means for engaging at least the most downstream located book block on the transverse stack conveyor and rotating the engaged book block from the vertical orientation into a substantially horizontal orientation, said engaging and rotating means including:

movable stop means positioned adjacent the downstream end of the transverse stack conveyor, said stop means defining a rotatable support plane and having a first position wherein said support plane is substantially parallel to the pages of the book blocks on the transverse stack conveyor, said stop means having a second position where said support plane is oriented substantially horizontally; and book block engaging means mounted for rotation with said stop means, said book block engaging means being energizable to engage a book block to be reoriented and to hold the engaged book block on said stop means during the rotation thereof, said book block engaging means including:

clamp means, said clamp means being offset with respect to the path of motion of the book blocks on the transverse stack conveyor, said clamp means having relatively moveable book block engaging jaws;

means for pushing a book block to be reoriented transversely with respect to the direction of motion of the transverse stack conveyor to place the thus pushed book block in the zone of operation of said offset clamp means; and means for imparting motion to the jaws of said clamp means, said clamp means being mounted for movement with said stop means.

11. The apparatus of claim 10 wherein said stop means comprises a pivotal rack.

12. The apparatus of claim 10 further comprising:

means for controllably rotating book blocks about a vertical axis, said rotating means being located downstream of said movable stop means for receiving book blocks which have been placed in a horizontal orientation, said rotating means selectively further reorienting said book blocks, said rotating means including:

connecting conveyor means, said connecting conveyor means being substantially coplanar with said support plane when in the horizontal orientation;

rotatable clamp means, said rotatable clamp means engaging a book block on said connecting conveyor means raising and rotating the book block engaged thereby; and means for adjusting the vertical position of said connecting conveyor means so that rotated book blocks can be discharged therefrom at a selected delivery elevation.

13. The apparatus of claim 12 wherein said movable stop means comprises:

belt conveyor means, said belt conveyor means being mounted for pivotal motion about a first end thereof, said belt conveyor means including at least a first conveyor belt having a surface which defines said support plane; and actuator means for imparting motion to said belt conveyor means whereby said support plane will move between a substantially vertical position and a substantially horizontal position; and wherein said book block engaging means comprises:

holding means selectively operable to hold and release a book block to be moved with said belt conveyor means.

14. The apparatus of claim 13 further comprising:

means for contacting the book block on the transverse stack conveyor which is located adjacent to the book block engaged by said book block engaging means said contacting means retarding motion of the contacted book block whereby the stack of book blocks supported on the transverse stack conveyor upstream of the book block engaged by said book block engaging means is immobilized during the rotation thereof from a vertical orientation into a horizontal orientation.

* * * * *